(12) United States Patent
Beyer et al.

(10) Patent No.: US 7,184,413 B2
(45) Date of Patent: Feb. 27, 2007

(54) ADAPTIVE COMMUNICATION PROTOCOL FOR WIRELESS NETWORKS

(75) Inventors: David A. Beyer, Los Altos, CA (US); J. Joaquin Garcia-Luna-Aceves, San Mateo, CA (US); Chane L. Fullmer, Santa Cruz, CA (US)

(73) Assignee: Nokia Inc., Espoo (FI)

( * ) Notice: Subject to any disclaimer, the term of this patent is extended or adjusted under 35 U.S.C. 154(b) by 0 days.

(21) Appl. No.: 09/248,738

(22) Filed: Feb. 10, 1999

(65) Prior Publication Data

US 2006/0104301 A1 May 18, 2006

(51) Int. Cl.
*H04L 12/28* (2006.01)
*H04J 3/02* (2006.01)
*H04J 3/06* (2006.01)
*H04Q 7/24* (2006.01)

(52) U.S. Cl. .................. 370/254; 370/338; 370/462; 370/503

(58) Field of Classification Search ........ 370/254–255, 370/257, 310, 336–337, 345, 347–348, 431, 370/437, 442–445, 447, 450, 458–459, 464–465, 370/468, 478, 498, 503, 913, 338, 350, 462; 455/450; 709/248; 368/47
See application file for complete search history.

(56) References Cited

U.S. PATENT DOCUMENTS

| | | | |
|---|---|---|---|
| 4,270,211 A | | 5/1981 | Schlichte |
| 4,466,060 A | | 8/1984 | Riddle |
| 4,661,902 A | | 4/1987 | Hochsprung et al. |
| 4,677,617 A | * | 6/1987 | O'Connor et al. .......... 370/436 |
| 5,088,032 A | | 2/1992 | Bosack ....................... 395/200 |
| 5,130,987 A | * | 7/1992 | Flammer .................... 370/436 |

(Continued)

FOREIGN PATENT DOCUMENTS

EP 0 539 737 A1 5/1993

(Continued)

OTHER PUBLICATIONS

Imrich Chlamtac, Andras Farago, and Hongbiao Zhang, "Time-Spread Multiple-Access (TSMA) Protocols for Multihop Mobile Radio Networks", IEEE/ACM Transactions on Networking, vol. 5, No. 6, Dec. 1997, pp. 804-812.

(Continued)

*Primary Examiner*—Kevin C. Harper
(74) *Attorney, Agent, or Firm*—Squire, Sanders & Dempsey L.L.P.

(57) ABSTRACT

A communication protocol that provides link-level and media access control (MAC) level functions for wireless (e.g., ad-hoc) networks and is robust to mobility or other dynamics, and for scaling to dense networks. In a mobile or otherwise dynamic network, any control-packet collisions will be only temporary and fair. In a dense network, the network performance degrades gracefully, ensuring that only a certain percentage of the common channel is consumed with control packets. The integrated protocol allows packets (e.g., data scheduling control packets) to be scheduled in a collision-free and predictable manner (known to all neighbors), multicast packets can be reliably scheduled, as well as streams of delay- or delay-jitter-sensitive traffic. Further, using an optional network code, the scheduling of control packets can appear to observers to be randomized.

68 Claims, 6 Drawing Sheets

U.S. PATENT DOCUMENTS

| | | | |
|---|---|---|---|
| 5,142,533 A * | 8/1992 | Crisler et al. ............... | 370/349 |
| 5,231,634 A | 7/1993 | Giles et al. | |
| 5,319,641 A | 6/1994 | Fridrich et al. | |
| 5,408,506 A | 4/1995 | Mincher et al. | |
| 5,416,473 A | 5/1995 | Dulaney, III et al. | |
| 5,453,977 A * | 9/1995 | Flammer et al. ............ | 370/254 |
| 5,471,469 A * | 11/1995 | Flammer et al. ............ | 370/346 |
| 5,502,724 A | 3/1996 | Chen et al. | |
| 5,519,717 A * | 5/1996 | Lorenzo et al. ............. | 375/134 |
| 5,548,578 A | 8/1996 | Matsune et al. | |
| 5,557,748 A | 9/1996 | Norris | |
| 5,600,635 A | 2/1997 | Hamaki et al. | |
| 5,638,371 A | 6/1997 | Raychaudhuri et al. | |
| 5,682,382 A | 10/1997 | Shepard | |
| 5,687,015 A * | 11/1997 | Abe .......................... | 359/161 |
| 5,706,291 A | 1/1998 | Kainulainen et al. | |
| 5,721,725 A | 2/1998 | Want et al. | |
| 5,737,318 A | 4/1998 | Melnik | |
| 5,752,193 A | 5/1998 | Scholefield et al. | |
| 5,771,462 A | 6/1998 | Olsen | |
| 5,896,375 A * | 4/1999 | Dent et al. .................. | 370/347 |
| 5,918,016 A | 6/1999 | Brewer et al. | |
| 5,968,133 A * | 10/1999 | Latham et al. .............. | 709/220 |
| 6,026,303 A * | 2/2000 | Minamiawa ................ | 455/466 |
| 6,108,314 A | 8/2000 | Jones et al. | |
| 6,115,394 A * | 9/2000 | Balachandran et al. ..... | 370/477 |
| 6,178,323 B1 * | 1/2001 | Nagata ....................... | 455/416 |
| 6,229,810 B1 * | 5/2001 | Gerszberg et al. .......... | 370/401 |
| 6,292,494 B1 * | 9/2001 | Baker et al. ................ | 370/459 |
| 6,385,198 B1 * | 5/2002 | Ofek et al. ................. | 370/389 |
| 2003/0043763 A1 * | 3/2003 | Grayson ..................... | 370/329 |

FOREIGN PATENT DOCUMENTS

| | | |
|---|---|---|
| EP | 0539737 A1 | 5/1993 |
| EP | 0 565 180 A2 | 10/1993 |
| EP | 0565180 A2 | 10/1993 |
| EP | 0 615 364 A1 | 9/1994 |
| EP | 0615364 A1 | 9/1994 |
| EP | 0 841 763 A1 | 5/1998 |
| EP | 0841763 A1 | 5/1998 |
| GB | 2 271 251 A | 4/1994 |
| GB | 2271251 A | 4/1994 |
| GB | 2 313 254 A | 11/1997 |
| GB | 2313254 A | 11/1997 |
| WO | WO 96/19887 A | 6/1996 |
| WO | WO 97/09805 | 3/1997 |
| WO | WO 97/09805 A | 3/1997 |
| WO | WO 98/09469 A1 | 3/1998 |
| WO | WO 98/09496 | 3/1998 |
| WO | WO 98/18280 | 4/1998 |
| WO | WO 98/18280 A2 | 4/1998 |
| WO | WO 98/09469 | 5/1998 |
| WO | WO 98/35514 | 8/1998 |
| WO | WO 98/35514 A2 | 8/1998 |
| WO | WO 00/48367 | 8/2000 |
| WO | WO 00/48367 A2 | 8/2000 |

OTHER PUBLICATIONS

Imrich Chlamtac, Andras Farago, "Making Transmission Schedules Immune to Topology Changes in Multi-Hop Packet Radio networks", IEEE/ACM Transactions on Networking, vol. 2, No.1, Feb. 1994, pp. 23-29.

Durga P. Satapathy and Jon M. Peha, "Etiquette Modification for Unlicensed Spectrum: Approach and Impact", Proceedings of the IEEE Vehicular Technology Conference, vol. 1, May 1998, pp. 272-276.

J. J. Garcia-Luna-Aceves and Chane L. Fullmer, "Performance of Floor Acquisition Multiple Access in Ad-Hoc Networks".

Anthony Ephremides and Bruce Hajek, "Information Theory and Communication Networks: and Unconsummated Union", IEEE Transactions on Information Theory, vol. 44, No. 6, Oct. 1998, pp. 1 and pp. 3.

Ji-Her Ju and Victor O. K. Li, "An Optimal Topology-Transparent Scheduling Method in Multihop Packet Radio Networks", IEEE Transactions on Networking, vol. 6, No. 3, Jun. 1998, pp. 298-306.

C. David Young, "USAP: A Unifying Dynamic Distributed Multichannel TDMA Slot Assignment Protocol", Rockwell International Communication Systems Division, Oct. 1996, pp. 1-5.

Anthony Ephremides and Thuan V. Truong, "Scheduling Broadcasts in Multihop Radio Networks", IEEE Transactions on Communications, vol. 38, No. 4, Apr. 1990, pp. 456-460.

Timothy J. Shepard, "A Channel Access Scheme for Large Dense Packet Radio Networks", Proceedings of ACM SIGCOMM'96, Aug. 1996, Stanford University, California, pp. 1-12.

S. Ramanathan and Errol L. Lloyd, "Scheduling Algorithms for Multi-hop Radio Networks", ACM Transactions, 1992, pp. 211-222.

David A. Beyer, "Accomplishments of the Darpa Suran Program", *Information and Telecommunication Sciences and Technology Division SRI International*, 1990, pp. 0855-0862.

David A. Beyer et al., "Packet Radio Network Research Network Research, Development and Application", *Information and Telecommunication Sciences and Technology Division SRI International*, pp. 1-35.

J.J. Garcia-Luna-Aceves and David Beyer, Wireless Internet Gateways (WINGS), pp. 1-6.

J.J. Garcia-Luna-Aceves and David Beyer, "A Unified Routing Approach for AD_HOC Internetworking", *Rooftop Communications Corporation*, pp. 1-16.

Haartsen J et al; "Bluetooth; Vision, Goals, and Architecture" Mobile Computing and Communications Review, US, ACM, New York, NY, vol. 2, No. 4, Oct. 1, 1998, pp. 35-45, XP000784002, p. 41, paragraph III.D.

PCT Search Report, PCT/US99/21238, Sep. 22, 1999, Date of Mailing: Oct. 6, 2000 (11 pgs.).

F.A. Tobagi and L. Kleinrock, "Packet switching in radio channels: Part II—the hidden terminal problem in carrier sense multiple-access modes and the busy-tone solution," IEEE Trans. Commun., vol. COM-23, No. 12, pp. 1417-1433 (1975).

R.M. Metcalfe and D.R. Boggs, "ETHERNET: Distributed packet switching for local computer networks," Communications of the ACM, vol. 19, No. 7, pp. 395-403 (1976).

C. Wu and V.O.K. Li, "Receiver-initiated busy-tone multiple access in packet radio networks," ACM SIGCOMM '87 Workshop: Frontiers in Computer Communications Technology, Stowe, VT, USA, pp. 11-13 (Aug. 1987).

F.A. Tobagi and L. Kleinrock, "Packet switching in radio channels: Part III—polling and (dynamic) split-channel reservation multiple access," IEEE Trans. Commun., vol. COM-24, No. 8, pp. 832-845 (1975).

P. Karn, "MACA—a new channel access method for packet radio," in ARRL/CRRL Amateur Radio 9th Computer Networking Conference, pp. 134-140, ARRL (Apr. 1990).

C.L. Fullmer and J.J. Garcia-Luna-Acheves, "Solutions to Hidden Terminal Problems in Wireless Networks," Proceedings of ACM SIGCOMM '97, Cannes, France (Sep. 14-18, 1997).

C.L. Fullmer and J.J. Garcia-Luna-Acheves, "Floor Acquisition Multiple Access (FAMA) for Packet-Radio Networks," Proceedings of ACM SIGCOMM '95, Cambridge, MA (Aug. 28-Sep. 1, 1995).

K.C. Chen, "Medium-Access Control of Wireless LANs for Mobile Computing," IEEE Network, vol. 8, No. 5, pp. 50-63 (1994).

V. Bharghavan, A. Demers, S. Shenker, and L. Zhang, "MACAW: A Media Access Protocol for Wireless LAN's," Proceedings of ACM Sigcomm '94, London, UK, pp. 212-225 (Aug. 31-Sep. 2, 1994).

B. Vaduvur, "Access, Addressing and Security in Wireless Packet Networks," PhD thesis, University of California, Berkeley, Computer Science Department (1995).

A. Colvin, "CSMA with collision avoidance," Computer Communications, vol. 6, No.5, pp. 227-235 (1983).

W.F. Lo and H.T. Mouftah, "Carrier Sense Multiple Access with Collision Detection for Radio Channels," IEEE 13th International Communications and Energy Conference, pp. 244-247, IEEE (1984).

R. Rom, Collision Detection in Radio Channels, Local Area and Multiple Access Networks, pp. 235-249, Computer Science Press (1986).

G.S. Sidhu, R.F. Andrews, and A.B. Oppenheimer, Inside Apple Talk, Second Edition, Addison-Wesley Publishing Company, Inc. (1990).

Chenxi Zhu and M.S. Corson, "A Five-Phase Reservation Protocol (FPRP) for Mobile Ad Hoc Networks," Proceedings of IEEE INFOCOM '98 (1998).

Z. Tang and J.J. Garcia-Luna-Acheves, "Hop Reservation Multiple Aceess (HRMA) for Multichannel Packet Radio Networks," Proceedings of IEEE IC3N '98: Seventh International Conference on Computer Communication Networks, Lafayette, Louisiana (Oct. 12-15, 1998).

I. Chlamtac and A. Lerner, "Fair Alrogrithms for Maximal Link Activation in Multihop Radio Networks," IEEE Transactions on Communications, vol. COM-35, No. 7 (Jul. 1987).

C. David Young, "USAP: a unifying dynamic distributed multichannel TDMA slot assignment protocol," MILCOM '96 Conference Proceedings, vol. 1, pp. 235-239 (Oct. 1996).

L. Kleinrock and F.A. Tobagi, "Packet Switching in Radio Channels: Part 1—Carrier Sense Multiple Access Modes and Their Throughput-Delay Characteristics," IEEE Trans. Comm., vol. COM-23, No. 12, pp. 1400-1416 (1975).

Barry M. Leiner, Donald L. Nielson, and Fouad A. Tobagi, "Issues in Packet Radio Network Design," Proceedings of the IEEE, vol. 75, No. 1, pp. 6-20 (Jan. 1987).

J.J. Garcia-Luna-Aceves, et al., "Wireless Internet Gateways (WINGS)," Annual Military Communications Conference, New York, New York, XP-000792611, IEEE pp. 1271-1276 (Nov. 3, 1997).

J. Jubin and J. Tornow, "The DARPA Packet Radio Network Protocols," Proceedings of the IEEE, vol. 75, No. 1, pp. 21-32 (Jan. 1987).

J.J. Garcia-Luna-Aceves, et al., "Wireless Internet Gateways (WINGS)," Proc. IEEE MILCOM '97, Monterey, California (Nov. 1997).

C.V. Ramamoorthy and W. Tsai, "An Adaptive Hierarchical Routing Algorithm," Proceedings of IEEE COMPSAC '83, Chicago, Illinois, pp. 93-104 (Nov. 1993).

S. Murthy and J.J. Garcia-Luna-Aceves, "Loop-Free Internet Routing Using Hierarchical Routing Trees," Proc. IEEE INFOCOMM '97, Kobe, Japan (Apr. 7-11, 1997).

R.L. Brewster and A.M. Glass, "Throughput Analysis of Non-Persistent and Slotted Non-Persistent CSMA/CA Protocols," in 4th International Confernece on Land Mobile Radio, Institution of Electrronic and Radio Engineers, pp. 231-236 (1987).

H.S. Chhaya and S. Gupta, "Performance Modeling of Asynchronous Data Transfer Methods of IEE 802.11 MAC Protocol," Wireless Networks, vol. 3, No. 3, pp. 217-234 (1997).

C.L. Fullmer and J.J. Garcia-Luna-Aceves, "FAMA-PJ: A Channel Access Protocol for Wireless LANs," Proc. First International Conference on Mobile Computing and Networking 1995, Berkeley, California (Nov. 14-15, 1995).

R. Garces and J.J. Garcia-Luna-Aceves, "Floor Acquisition Multiple Access with Collision Resolution," Proc. Second International Conference on Mobile Computing and Networking 1996, Rye, New York (Nov. 10-12, 1996).

L. Kleinrock and M.O. Scholl, "Packet Switching in Radio Channels: New Conflict-Free Multiple Access Schemes," IEEE Trans. Commun., vol. COM-28, pp. 1015-1029 (1980).

J. Meditch and C. Lea, "Stability and Optimization of CSMA and CSMA/CD Channels," in Advances in Local Area Networks, IEEE Press, pp. 340-362 (1987).

R. Rom and M. Sidi, "Multiple Access Protocols Performance and Analysis," Springer-Verlag (1990).

Takagi and L. Kleinrock, "Output processes in contention packet broadcasting systems," IEEE Trans. Commun., vol. COM-33, No. 11, pp. 1191-1199 (1985).

J. Weinmiller, M. Schlager, A. Festag, and A. Wolisz, "Performance Study of Access Control in Wireless LANs—IEEE 802.11 DFWMAC and ETSI RES 10 Hiperian," Mobile Networks and Applications, vol. 2, No. 1, pp. 55-68 (Jun. 1997).

P802.11 Draft Standard for Information Technology—Telecommunications and information exchange between systems—Local and metropolitan area networks—Specific requirements—"Part 11: Wireless LAN Medium Access Control (MAC) and Physical Layer (PHY) Specifications," IEEE P802.11/D10 (Jan. 14, 1999).

Timothy J. Shepard, "A Channel Access Scheme for Large Dense Packet Radio Networks," Proceedings of ACM SIGCOMM '96, Stanford University, pp. 1-12 (Aug. 1996).

I. Chlamtac, Andras Farago, and Hongbiao Zhang, "Time-Spread Multiple-Access (TSMA) Protocols for Multihop Mobile Radio Networks," IEEE/ACM Transactions on Networking, vol. 5, No. 6, pp. 804-812 (Dec. 1997).

Ji-Her Ju and Victor O.K. Li, "An Optimal Topology-Transparent Scheduling Method in Multihop Packet Radio Networks," IEEE/ACM Transactions on Networking, vol. 6, No. 3, pp. 298-306 (Jun. 1998).

A. Ephremides and T. Truong, "Scheduling Broadcasts in Multihop Radio Networks," IEEE Transactions on Communications, vol. COM-38, No. 4 (Apr. 1990).

I. Chlamtac, W.R. Franta, and K.D. Levin, "BRAM: The Broadcast Recognizing Access Method," IEEE Trans Commun., vol. COM-27, No. 8 pp. 1183-1189 (Aug. 1979).

J. Haartsen, et al., "Bluetooth: Vision, Goals, and Architecture," Mobile Computing and Communications Review, XP-0007854002, US, ACM, New York, NY, vol. 2, No. 4, pp. 38-45 (Oct. 1, 1998).

S. Murthy and J.J. Garcia-Luna-Aceves, "Loop-Free Internet Routing Using Hierarchical Routing Trees," Proc. IEEE INFOCOMM '97, Kobe, Japan (Apr. 7-11, 1997).

Imrich Chlamtac and Andras Farago, "Making Transmission Schedules Immune to Topology Changes in Multi-Hop Packet Radio Networks," IEEE/ACM Transactions on Networking, vol. 2, No. 1, pp. 23-29 (Feb. 1994).

Anthony Ephremides and Bruce Hajek, "Information Theory and Communication Networks: an Uncomsummated Union," IEEE Transactions on Information Theory, vol. 44, No. 6, pp. 1 & 3 (Oct. 1998).

C. David Young, "USAP: A Unifying Dynamic Distributed Multichannel TDMA Slot Assignment Protocol," Rockwell International Communication Systems Division, pp. 1-5 (Oct. 1996).

S. Ramanathan and Errol L. Lloyd, "Scheduling Algorithms for Multi-hop Radio Networks," ACM Transactions, pp. 211-222 (1992).

David A. Beyer, "Accomplishments of the DARPA SURAN Program," Information and Telecommunications Sciences and Technology Division, SRI International, pp. 0855-0862 (Jun. 1990).

David A. Beyer, et al., "Packet Radio Network Research, Development and Application," Information and Telecommunications Sciences and Technology Division, SRI International, pp. 1-35.

J.J. Garcia-Luna-Aceves and David A. Beyer, "A Unified Routing Approach for Ad-Hoc Internetworking," Rooftoop Communications Corporation, pp. 1-16.

N. Abramson, "The ALOHA System—Another Alternative for Computer Communications," in Proc., Fall Joint Computer Conference, pp. 281-285 (1970).

F. Tobagi, "Random Access Techniques for data transmission over packet switched radio networks," PhD Thesis, University of California, Los Angeles, Computer Science Department, School of Engineering and Applied Science, Report UCLA-ENG 7499 (1974).

F.A. Tobagi and L. Kleinrock, "The Effect of Acknowledgement Traffic on the Capacity of Packet-Switched Radio Channels," IEEE Trans. Commun. vol. COM-26, No. 6, pp. 815-826 (1978).

R.E. Kahn, et al., "Advances in Packet Radio Technology," Invited Paper, Proceedings of the IEEE, vol. 66, No. 11, pp. 1468-1496 (Nov. 1978).

David A. Beyer, "Survivable Adaptive Networks (SURAN) Program: vol. II, Executive Summary," Final Report, Mar. 1992.

David A. Beyer, "Survivable Adaptive Networks (SURAN) Program: vol. III, Technical," Final Report, Mar. 1992.

G. Jones, Packet Radio: What? Why? How? Articles and Information on General Packet Radio Topics, published by Tuscon Amateur Packet Radio Corporation, Tucson, AZ, pp. i-vii, 1-87, and 98-132 (1995).

D. Beyer, M. D. Vestrich, and J.J. Garcia-Luna-Aceves, "The Rooftop Community Network: Free, High-Speed Network Access for Communities", The First 100 Feet: New Options for Internet and Broadband Access (Hurley and Keller, Eds.), Harvard information Infrastructure Project, The MIT Press, pp. 75-91 (1999).

Revisions to IEEE Std 802.11-1997 IEEE Standard for Wireless LAN Medium Access Control (MAC) and Physical Layer (PHY), IEEE Draft 802.11rev/D6.2 (Jul. 1998).

D.A. Beyer, et al., "Packet Radio Network Research, Development and Application," Symposium on Packet Radio, Symposium Proceedings SP-5, vol. 1, pp. 1-73 (Apr. 1989).

SPARROW Quarterly Progress Reports, Q198-Q498, http://www.soc.ucsc.edu/research/ccrg/reports/SPARROW/q1-98.html (also q2-98.html, q3-98.html. and q4-98.html) (Sep. 18, 1997 through Sep. 1, 1998).

Kishor S. Trivedi, "Probability and Statistics with Reliability, Queing, and Computer Science Applications," pp. v-x, 1-53, and 411-468, Prentice-Hall (1982).

* cited by examiner

ADAPTIVE COMMUNICATION PROTOCOL FOR WIRELESS NETWORKS

STATEMENT OF GOVERNMENT LICENSE RIGHTS

The United States Government has a paid-up license in portions of this invention and the right in limited circumstances to require the patent owner to license others on reasonable terms as provided for by the terms of Contract No.: DAAH01-98-C-R005, awarded by the U.S. Army Aviation & Missile Command.

FIELD OF THE INVENTION

The present invention relates to communications protocols for use in computer networks and, more particularly, such protocols for use at the medium access control and/or link levels in ad-hoc wireless networks.

BACKGROUND

Multihop packet radio networks (i.e., ad-hoc networks) extend packet switching technology into environments with mobile users. Such networks can be installed quickly in emergency situations, and are self-configurable. The medium access control (MAC) protocol that allows packet radios (or stations) to share a common broadcast channel is an essential component of a packet radio network.

There are two main classes of MAC protocols: contention-based protocols and contention-free protocols. Carrier sense multiple access (CSMA) protocols (see, e.g., L. Kleinrock & F. A. Tobagi, "Packet Switching in Radio Channels: Part I—Carrier Sense multiple Access Modes and their throughput-Delay Characteristics," IEEE Trans. Comm., Vol. COM-23, No. 12, pp. 1400–1416 (1975)) are one the most popular examples of contention-based MAC protocols and have been used in a number of packet radio networks in the past, such as described in B. M. Leiner et al., eds. Proceedings of the IEEE, Vol. 75 (January 1987). These protocols attempt to prevent a station from transmitting simultaneously with other stations within its transmitting range by requiring each station to listen to the channel before transmitting.

The hardware characteristics of packet radios are such that a packet-radio cannot transmit and listen to the same channel simultaneously; therefore, collision detection (e.g., CSMA/CD, as described by R. M. Metcalfe & D. R. Boggs, "ETHERNET: Distributed Packet Switching for Local Computer Networks," Communications of the ACM, Vol. 19, No. 7, pp. 395–403 (1976)) cannot be used in a single-channel packet radio network. Further, although the throughput of CSMA protocols is very good, as long as the multiple transmitters within range of the same receivers can sense one another's transmissions, "hidden terminal" problems degrade the performance of CSMA substantially. This is because carrier sensing cannot prevent collisions in that case. See, e.g., F. A. Tobagi & L. Kleinrock, "Packet Switching in Radio Channels: Part II—the Hidden Terminal Problem in Carrier Sense Multiple Access Modes and the Busy-Tone Solution," IEEE Trans. Comm., Vol. 23, No. 12, pp. 1417–1433 (1975).

The busy tone multiple access (BTMA) protocol advanced by Tobagi and Kleinrock was the first proposal to combat the hidden-terminal problems of CSMA. BTMA is designed for station-based networks and divides the channel into a message channel and the busy-tone channel. The base station transmits a busy-tone signal on the busy-tone channel as long as it senses carrier on the data channel. Because the base station is in line of sight of all terminals, each terminal can sense the busy-tone channel to determine the state of the data channel. The limitations of BTMA are the use of a separate channel to convey the state of the data channel, the need for the receiver to transmit the busy tone while detecting carrier in the data channel and the difficulty of detecting the busy-tone signal in a narrow-band channel.

A receiver initiated busy-tone multiple access protocol for packet-radio networks has also been proposed. C. Wu & V. O. K. Li, "Receiver-Initiated Busy-Tone Multiple Access in Packet Radio Networks," ACM SIGCOMM 87 Workshop: Frontiers in Computer Communications Technology, Aug. 11–13, 1987. In this scheme, the sender transmits a request-to-send (RTS) to the receiver, before sending a data packet. When the receiver obtains a correct RTS, it transmits a busy tone in a separate channel to alert other sources nearby that they should backoff. The correct source is always notified that it can proceed with transmission of the data packet. One limitation of this scheme is that it still requires a separate busy-tone channel and full-duplex operation at the receiver, thereby making it impractical for packet radio networks.

One of the first protocols for wireless networks based on a handshake between sender and receiver was SRMA (split-channel reservation multiple access). F. A. Tobagi & L. Kleinrock, "Packet Switching in Radio Channels: Part III—Polling and (Dynamic) Split-Channel Reservation Multiple Access,"IEEE Trans. Comm., Vol. COM-24, No. 8, pp. 832–845 (1976). According to SRMA, the sender of a packet uses ALOHA or CSMA to decide when to send a clear-to-send (CTS) if it receives the RTS correctly. The CTS tells the sender when to transmit its data packet. Although SRMA was proposed with one or two control channels for the RTS/CTS exchange, the same scheme applies for a single channel.

Since the time SRMA was first proposed, several other MAC protocols have been proposed for either single-channel wireless networks or wireline local area networks that are based on similar RTS-CTS exchanges, or based on RTSs followed by pauses. See, e.g., V. Bharghavan et al., "MACAW: A Medium Access Protocol for Wireless LANs," Proc. ACM SIGCOMM '94, pp. 212–25, Aug. 31–Sep. 2, 1994; V. Bharghavan, "Access, Addressing and Security in Wireless Packet Networks, PhD Thesis, University of California, Berkeley, Computer science Dept. (1995); A. Colvin, "CSMA with Collision Aviodance," Computer Comm., Vol. 6, No. 5, pp. 227–235 (1983); W. F. Lo & H. T. Mouftah, "Carrier Sense Multiple Access with Collision Detection for Radio Channels, " IEEE $13^{th}$ Int'l Comm. And Energy Conf., pp. 244–247 (1984); R. Rom, "Collision Detection in Radio Channels" pp. 235–49 (1986); and G. S. Sidhu et al., "Inside Apple Talk," 2d ed. (1990). In addition, Karn proposed a protocol called MACA (multiple access collision avoidance) to address the problems of hidden terminals in single-channel SRMA using ALOHA for the transmission of RTSs. P. Karn, "MACA—A New Channel Access Method for Packet Radio," ARRL/CRRL Amateur Radio $9^{th}$ Computer Networking Conference, pp. 134–140 (1990). This protocol attempts to detect collisions at the receiver by means of the RTS-CTS exchange without carrier sensing. A committee of the Institute of Electrical and Electronic Engineers (IEEE) overseeing the 802.11 specification for computer networking has proposed a MAC protocol for wireless LANs that includes a transmission mode based on an RTS-CTS handshake (DFWMAC). K. C. Chen, "Medium Access Control of Wireless LANs for Mobile Computing,"

IEEE Network, Vol. 8, No. 5, pp. 50–63 (1994); P802.11— Unapproved Draft: Wireless LAN Medium Access Control (MAC) and Physical Specifications, IEEE (January 1996).

Fullmer and Garcia-Luna-Aceves introduced a new variation on MAC protocols based on RTS-CTS exchanges that is particularly attractive for ad-hoc networks. C. L. Fullmer & J. J. Garcia-Luna-Aceves, "Solutions to Hidden Terminal Problems in Wireless Networks," Proc. ACM SIGCOMM '97, Sep. 14–18 (1997). This protocol is FAMA-NCS (floor acquisition multiple access with non-persistent carrier sensing). The objective of FAMA-NCS is for a station that has data to send to acquire control of the channel in the vicinity of the receiver (which is termed "the floor") before sending any data packet, and to ensure that no data packet collides with any other packet at the receiver.

The main problem with contention-based MAC protocols such as those discussed above is that they do not provide delay access guarantees. This shortcoming renders contention-based protocols inefficient for such applications as void transfer over wireless networks. Collision-free protocols can provide channel access delay guarantees; however, very few protocols have been designed to operate in multihop wireless networks.

Another protocol family used in networks is the time division multiple access (TDMA) protocol family. Here, time is divided into frames consisting of time slots. Time slots are allocated to specific nodes or a centralized station is used to allocate the time slots. The limitations of TDMA stem from the fixed assignment of time slots to nodes, which is slow to adapt to network changes and makes inefficient use of the channel if nodes are bursty sources of traffic (such as is the case in ad-hoc environments), and the use of centralized assignments. A number of protocols have been proposed in the recent past to provide dynamic time-slot allocation without requiring central base stations. These protocols can be classified as topology-independent and topology-dependent time scheduling protocols.

Shepard, Chlamtac, and Ju and Li have proposed topology-independent time-scheduling protocols. T. Shepard, "A Channel Access Scheme for Large Dense Packet Radio Networks," SIGCOMM '96 Conference Proc. (1996); I. Chlamatac et al., "Time-Spread Multiple-Access (TSMA) Protocols for Multihop Mobile Radio Networks," IEEE/ACM Transactions on Networking, Vol. 5, No. 6 (December 1997); Ji-Her Ju & Victor O. K. Li, "An Optical Topology-Transparent Scheduling Method in Multihop Packet radio Networks," IEEE/ACM Transactions on Networking Vol. 6, No. 3 (June 1998). In these protocols, nodes are pre-assigned (by means of their nodal IDs, for example) or adopt a transmission schedule that they publish, and such a schedule specifies the times when a node transmits and receives. The protocols guarantee or provide a high likelihood that at least one transmission time in a node's schedule does not conflict with any node one or two hops away.

In the Chlamtac and Ju approaches, nodes are unable to determine which transmissions will succeed, complicating the job of higher layer (e.g., link-layer) protocols. These approaches also require values for the total number of nodes in the network and maximum number of neighbors for each node, as input parameters to the algorithm, thus making them design for the worst case conditions (and thus, resulting in inefficiencies if the network is not as dense as expected), or being sensitive to actual network conditions (if the network is larger or more dense than expected).

Shepard's approach avoids collisions by assuming nodes are synchronized with their neighbors, have knowledge of their neighbors' schedules, and are able to receive from multiple transmitting neighbors simultaneously. This final assumption requires fairly sophisticated radio hardware.

Recently, Zhu and Corson (C. Zhu & M. S. Corson, "A Five-Phase Reservation Protocol (FPRP) for Mobile Ad Hoc Networks," Proc. IEEE INFOCOM '98) and Tang and Garcia-Luna-Aceves (Z. Tang & J. J. Garcia-Luna-Aceves, "Hop-Reservation Multiple Access (HRMA) for Multichannel Packet Radio Networks," Proc. IEEE IC3N '98: Seventh Int'l. Conf. On Computer Communications and Networks, Oct. 12–15, 1998; J. J. Garcia-Luna-Aceves, "SPARROW/WINGS Technologies," DARPA/SPAWAR Meeting, SPAWAR, San Diego, Nov. 18, 1998) have developed topology-dependent scheduling protocols, such that a node acquires a transmission schedule that allows the node to transmit without interfering with nodes one and two hops away from itself, and such that channel reuse is increased as the number of neighbors per node decreases. These protocols require nodes to contend in order to reserve collision-free time slots.

Other TDMA approaches that require an initial, topology-independent schedule, followed by communication among the network nodes to negotiate a final schedule include the following. Chlamtac proposed an algorithm based on a repeating link schedule that can adapt to traffic demands after some number of iterations of the algorithm. The algorithm starts with a "single-slot-per-link" schedule, such as provided by assigning each node a transmission slot according to its node ID. At each iteration, schedule information and a scheduling "token" are routed up and down a routing tree (established by means of pre-existing algorithms), to assign additional slots to nodes or links according to their degree of unmet traffic demands. I. Chlamtac, "Fair Algorithms for Maximal Link Activation in Multihop radio Networks," IEEE Transactions on Communications, Vol. COM-35, No. 7 (1987).

Ephremides and Truong proposed a similar algorithm in which each node is initially assigned a slot corresponding to its node ID, and then each node uses their assignment to pass "skeleton" schedules to their neighbors. During the next two frames (two iterations of communicating schedules), and in accordance with fixed node priorities, nodes are able to grab available slots until all available slots are taken (i.e., no more slots can be assigned without causing collisions. Because of the need for schedules that are relatively fixed, requiring a few iterations to converge, and of scheduling-frame size equal to the maximum size of the network, these approaches have limited scalability and robustness to mobility or other dynamics. A. Ephremides & T. Truong, "Scheduling Broadcasts in Multihop Radio Networks," IEEE Transactions on Communications, Vol. COM-38, No. 4 (1990).

The approach proposed by Young also requires initial assignment of one slot per node, and then negotiation of scheduling packets for assignment of the other slots. However, the initially assigned slot is limited to the first slot in each "frame." Thus, each node's assigned slot occurs every N frames, where N is the maximum network size. Because of this, the approach is not scalable. Also, because a node needs to wait up to N frames before a neighbor confirms a proposed schedule addition, the approach is relatively slow adapting to dynamic traffic conditions. C. David Young, "USAP: a unifying dynamic distributed multichannel TDMA slot assignment protocol", MILCOM '96 Conf. Proc., vol. 1, pp. 235–239 (October 1996).

SUMMARY OF THE INVENTION

In one embodiment, a node of a computer network is activated such that the node first attempts to establish contact with other nodes that may exist within the computer network and, if unsuccessful in doing so, then establishes itself as a single node network. The node may first attempt to establish contact with the other nodes by cycling through a set of one or more common channels (e.g., wireless communication channels) for communication within the computer network. At each channel, the node may attempt to establish contact by transmitting a request packet thereon. Then, after transmitting a request packet on one of the common channels, the node listens for a response packet before proceeding to a next one of the common channels. Upon receiving a response packet from one of the other nodes, the node enters a synchronization mode and joins the computer network.

Preferably, the response packet includes a parameter specifying time within the computer network, and may further include a code identifying the network. In such cases, the code identifying the network should be first included in the request packet.

In the event the node is established as a single node network, the node listens for attempts by further nodes to join a network. Upon detecting one or more attempts by the further nodes to join a network, the node transmits a response thereto. This response includes an indication of time within the single node network and may also include a network code.

In another embodiment, a first node of a computer network receives an indication of time within the computer network according to a second node of the computer network; and determines whether to adjust the time at the first node according to whether the indication of time received from the second node is younger or older than the time at the first node. Preferably, the time at the first node is only adjusted if the indication of time received from the second node is older than the time at the first node. In some cases, the indication of time received from the second node may be augmented for delays within the computer network before determining whether to adjust time at the first node. If the indication of time received from the second node differs from the time at the first node by less than a predetermined threshold amount, the first node determines whether the first node or the second node has an older time over the other and adjusts the time at the first node only if the time at the second node is older.

In yet another embodiment, a transmission time for a packet (e.g., a control packet) from a first node of a computer network is computed according to the identification of the node and the age of the network. The age of the network may be an indication of the network age up to the start of a current frame within which the control packet is to be transmitted. The computing is performed using a function that provides a varying (e.g., pseudorandom) distribution of results for varying inputs of the identification of the first node and the age of the network, the results varying from a minimum to a maximum representing a number of transmission slots per frame within which the packet may be transmitted. Such a function may be an encryption function or a hash function, for example. In other cases, the computing may be performed using a table of entries of pseudorandom values representing transmission slots within the frame within which the packet may be transmitted.

In addition to the above, the first node may also compute transmission times for other nodes of the computer network. Preferably, this is performed using unique identifiers for each of the other nodes and the network age. The computation is accomplished using a function that is also used for computing the transmission time for the first node and, in some cases, the other nodes are all within a two-hop neighborhood of the first node in the computer network.

The first node also resolves contentions for transmission times between itself and any of the other nodes according to a priority determination. This priority determination may be made using a function that provides a unique output for varying identification inputs, for example an encryption algorithm, or a table look-up. The priority determination may also take into account a priority bias associated with each of the nodes. In any event, the first node transmits at the transmission time if it is determined to have priority over the other nodes and, in some cases, if it further has priority exceeding a priority threshold.

The control packet that is transmitted may advertise a schedule for a data transmission. Such a schedule may include an identification of one or more nodes to receive the data transmission and/or a data transmission time and/or channel. The schedule may also include a persistence indicator (e.g., to indicate the number of frames beyond a current frame for which the data transmission will continue).

Within the control packets, local identifiers may identify sending and/or receiving nodes. Such local identifiers may be smaller than the network identifiers ordinarily associated with the nodes. A mapping of the local identifiers to the network identifiers may be periodically transmitted within the network. In other cases, the control packets may also include acknowledgement information to schedules and/or packets transmitted by one or more other nodes of the network.

The priority determination described above may, in some cases, be made using a table of pseudorandom values. In such cases, the table may be indexed by a value derived from a media access control (MAC) layer address of the first node to retrieve an entry corresponding to a first priority determination. This first priority determination may be checked by logically combining the MAC layer address of the first node with the entry corresponding to the first priority determination to resolve conflicts.

In still other embodiments, a topology-independent scheduling procedure may be used to determine candidate packet transmission times within a computer network for the transmission of packets therein and a topology-dependent scheduling procedure may be used to avoid collisions in contended time periods. The topology-independent scheduling procedure may utilize an age of the network together with unique identifiers for each node of the network to determine the candidate transmission times for each of the nodes. In one embodiment, the candidate transmission times for each of the nodes is computed using a function that provides a varying (e.g., pseudorandom) distribution of outputs for a varying sampling of inputs. This function may be a hash function, an encryption function or a table look-up operation.

Conflicts for the candidate transmission times for each of the nodes may be resolved according to a priority associated with each of the nodes. Such priorities may be determined according to a function that provides a unique output for each set of inputs, for example, an encryption function, a hash function or a table look-up operation. The inputs may be unique identifiers associated with each node, scheduling frame numbers for the network, and/or priority biases for each node.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Figure 1:
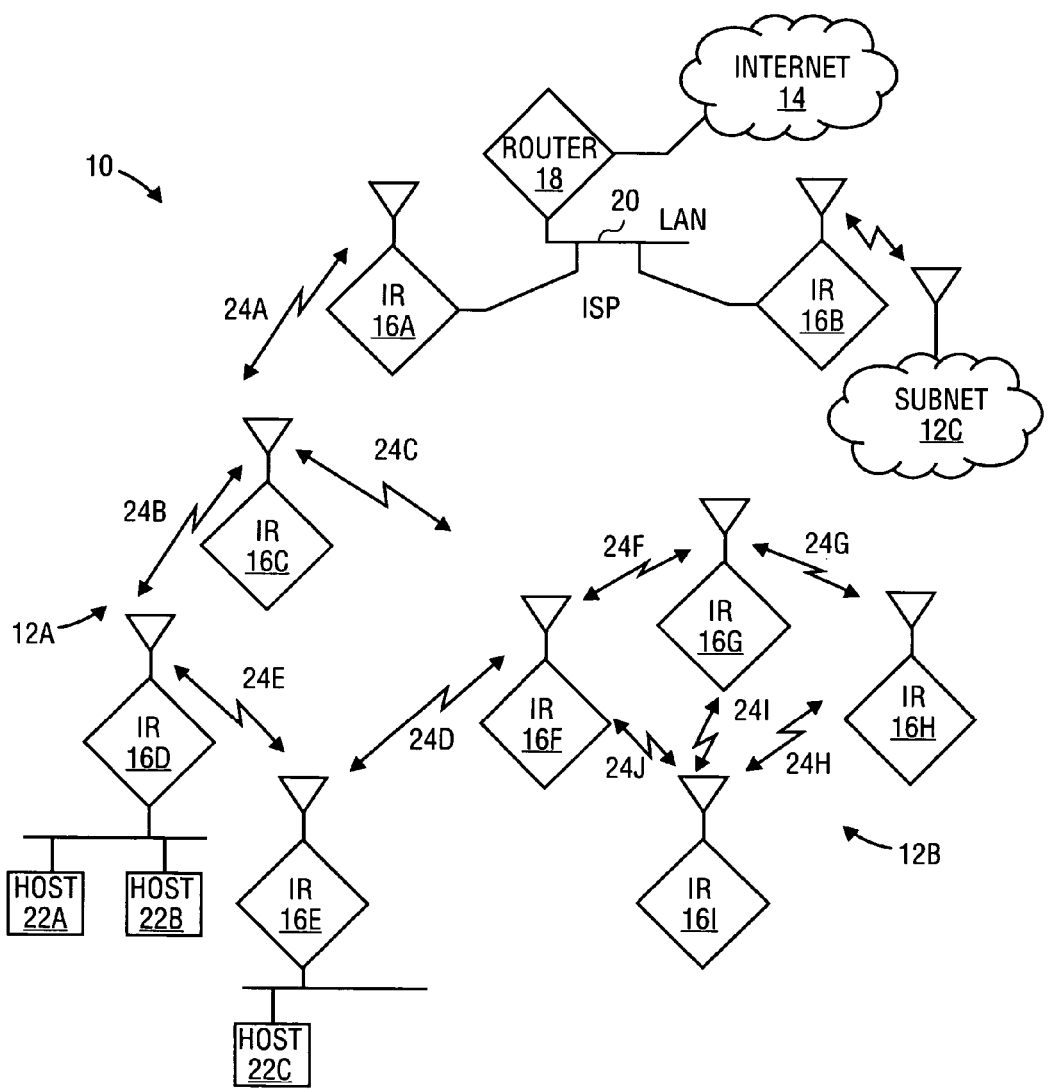
FIG. 1 illustrates an ad-hoc network that includes a number of sub-networks and an interconnection to the Internet through a router maintained by an Internet service Provider (ISP)

Presented below is a communication protocol that provides link-level and media access control (MAC) level functions for wireless (e.g., ad-hoc) networks. In ad-hoc networks, hosts and networks (e.g., local area networks or LANs) may be attached to packet radios (which will be referred to as Internet Radios (IRs) or nodes), which provide inter-node communication within the ad-hoc network. In contrast to conventional, wired networks, mobility of hosts and routers, and varying link and/or node conditions are often the rule, rather than the exception, in ad-hoc networks. FIG. 1 illustrates aspects of an exemplary ad-hoc network that will assist in understanding the remaining discussion.

Ad-hoc network 10 may be considered as a number of sub-networks 12a, 12b, 12c, which provide an extension of the Internet 14 through a number of IRs 16a–16i. Each IR 16a–16i may be a packet radio with an assigned IP address. In general, the IRs 16a–16i operate over a single channel using spread spectrum wireless communication techniques common in the art. For example, the IRs 16a–16i may operate in one of the unregulated UHF frequency bands, thereby obviating the need for operating licenses. As the figure illustrates, an IR is essentially a wireless IP router; with the exceptions that: a unique routing protocol that interacts through shared tables with the link-layer protocols in order to reduce control traffic and increase network efficiency may be used in place of conventional routing, neighbor management, link, and channel access protocols designed for the broadcast radio links 24a–24j of ad-hoc network 10 may be used in place of more conventional channel access protocols.

Coupling of ad-hoc network 10 to the Internet 14 may be achieved through a router 18, which may be operated by an Internet Service Provider (ISP). As shown, a single ISP may operate a LAN 20 to which multiple IRs are connected. In such a scheme, IRs 16a and 16b may act as "AirHeads", providing gateway service to Internet 14 via router 18. Some IRs, e.g., IRs 16d and 16e of FIG. 1, may be associated with hosts, 22a, 22b and 22c, that can be accessed by any Internet user through ad-hoc network 10.

Overview

Coordinating communications among IRs 16a–16i is an integrated protocol that performs all of the functions at the link and MAC layers of an Internet Radio Operating System (IROS). This protocol introduces a number of components, allowing for network synchronization to be tightly integrated with MAC scheduling; non-negotiated, collision-free transmission scheduling; adaptive scheduling of collision-free data transfers; and efficient discovery and acceptance of new and mobile nodes. Thus, packets for transmission within ad-hoc network 10 can be scheduled in a predictable, collision-free manner, thereby avoiding potential collisions with "hidden-terminals," after the network has stabilized.

More particularly, and as will become apparent from the discussion below, the scheduling procedure used by the integrated protocol will allow the scheduling of any packet transmission. Such scheduled packets are referred to below as "control packets" due to the natural use of the scheduling algorithm for collision-free, non-negotiated scheduling of MAC-layer control packets, which can then be used to dynamically schedule the transmission of data packets. Thus, the integrated protocol provides for the use of a common-channel for scheduling MAC-layer control packets and data channels for data packets. Multi-channel scheduling of data transmissions is also supported to permit multiple simultaneous transmissions within the same neighborhood In the basic scheme, each node only needs to know the addresses of the nodes in its local (e.g., two-hop) neighborhood, as well as the "age" of the network (a figure typically known in a synchronized network), to determine when packet transmissions will occur. Then, because packet transmissions can be predicted by a node's neighbors, the integrated protocol allows "sleeping" nodes to know when to wake up to transmit control packets, or when to listen to other neighbors' control packets. This scheduling process requires no real-time negotiation and it is fair in that each node with an equal number of two-hop-neighbors will have an equal probability of transmitting in any given time period (termed a frame, below). In addition, by communicating an optional "priority bias" specific to each node, the frequency of control packet transmissions can be gradually tuned according to a node's power-capabilities, or its traffic-handling priority in the network.

Network Synchronization

Figure 2:
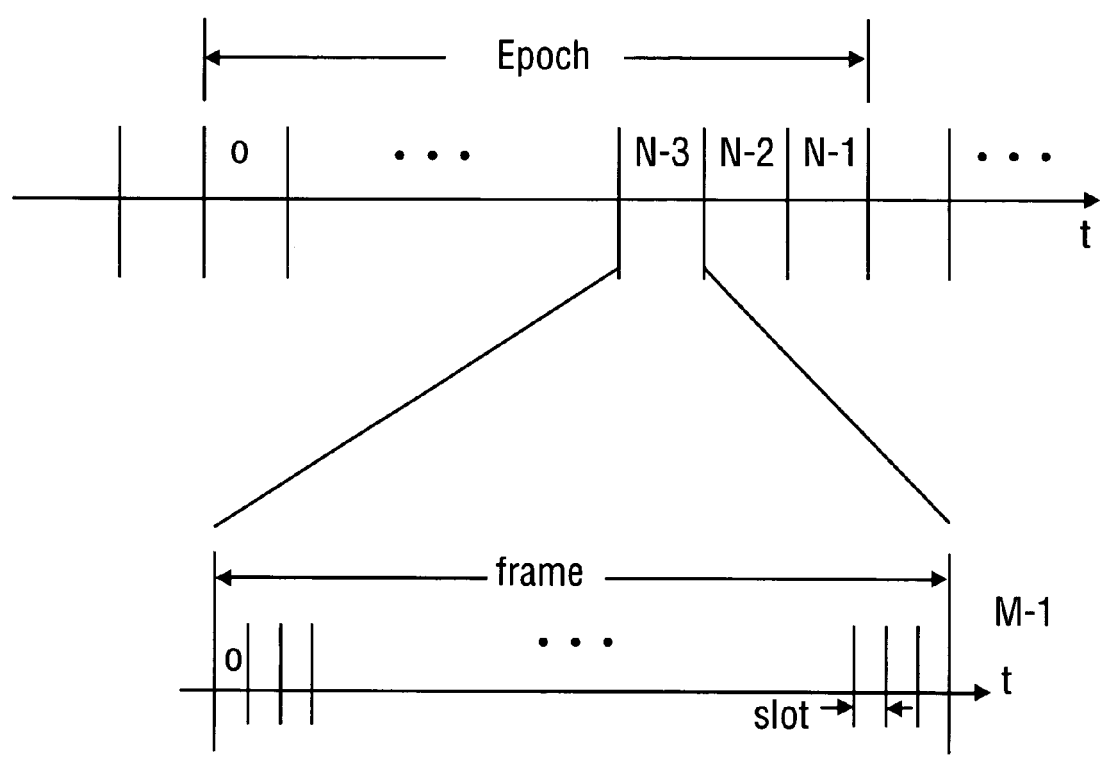
FIG. 2 illustrates a slot-frame-epoch methodology allowing for a computation of network time and age in accordance with an embodiment of the present invention.

The integrated protocol operates in a synchronized network where, as shown in FIG. 2, the nodes in the network agree on how time is divided into "slots" and then how slots are grouped into "frames". Although not required, frames may be further grouped into "epochs". Slots of a frame are numbered from 0 to M−1, while frames are numbered from 0 to N−1 frames per epoch. The integrated protocol schedules the start of transmissions (either individual packets or bursts of consecutive packets) to coincide with the start of a slot. Thus, the slot timing of each node and those in its 2-hop neighborhood should be synchronized within a Slot_Guard_Time parameter. However, a node may be synchronized more loosely with nodes further than two hops away.

A node's 2-hop neighborhood includes all of the node's direct neighbors (i.e., single or 1-hop neighbors) and 2-hop neighbors. Direct (1-hop) neighbors are nodes that are able to communicate directly with the subject node and are typically learned by a neighbor discovery and management protocol, possibly in combination with MAC-layer control packets. Two-hop neighbors are nodes that are not direct neighbors, but are direct neighbors of one or more of the subject node's direct neighbors. 2-hop neighbors may be learned through routing protocol updates, but may also be learned more quickly as part of the control packets sent by the MAC-layer (as can be supported by the present communications protocol, for instance). In FIG. 1 nodes 16c and 16e are two hops apart from one another (even when the separate possible paths are considered), while nodes 16a and 16e are further (i.e., three hops) apart.

To accommodate the above-noted scheduling, the synchronization scheme makes use of two parameters: Network Age and Network Time. The "Network Age" is the age of the synchronized network up to the start of the current frame (i.e., since the first node declared the birth of the synchronized network). In some cases this may be simply the optional epoch number (counted since the birth of this synchronized network), concatenated with the frame number within this epoch. The protocol uses the Network Age in its non-negotiated scheduling algorithm, both to schedule candidate slots for packet transmissions and to determine node priorities to fairly resolve contended slots in each frame. Depending on the implementation, a cycle-length of the Network Age (i.e., only some least-significant portion of the Network Age) may be communicated in common packet headers (see below), with the full Network Age used in key network synchronization and Network Merging packets.

The "Network Time" is defined as the Network Age concatenated with the slot number and precise time within the current slot (which will often be 0 for the time stamps tagged to packets, since transmissions are often started at the start of slots).

The synchronization scheme operates in a distributed fashion that does not rely on "master" nodes nor globally accessible timing sources. Instead, each node (e.g., 16a–16i) has access to a local timer to track "Network Time" and has the ability to "stamp" the local time of transmitted and received packets, with a predictable delay between when the packet was transmitted/received and when the packet was locally stamped. The resolution of the timer, and the variance in the processing delays for stamping packets, should be less than a fraction of the Slot_Guard_Time. Because the node timers are expected to drift at different rates, the synchronization scheme includes a component to maintain synchronization in an operating network and also accounts for starting and joining a network and merging two synchronized networks. These components are described below.

Starting and Joining a Network

When a node first powers up (e.g., after a reboot or reset), it enters an "Acquisition Mode" wherein it tries to join an existing network. Failing that, it declares itself a network of a single node, enters a "Sync Mode," and starts its slotting and Network Age counters (frame number and epoch number). Nodes only remain in Sync Mode as a single-node network for a limited time (with a random component) before cycling back to Acquisition Mode to again attempt to find an existing network.

In Acquisition Mode, a node rapidly cycles through a set of common channels that the network operates on (with channel waveforms optionally determined by a "Network Code" that may be programmed into the node by a network administrator). On each channel, the node: listens for a short time; transmits a short "NetSync Request" packet, which optionally includes a field for the Network Code, listens for a short time for a "NetSync Response" packet; and transitions to the next channel.

Figure 3:
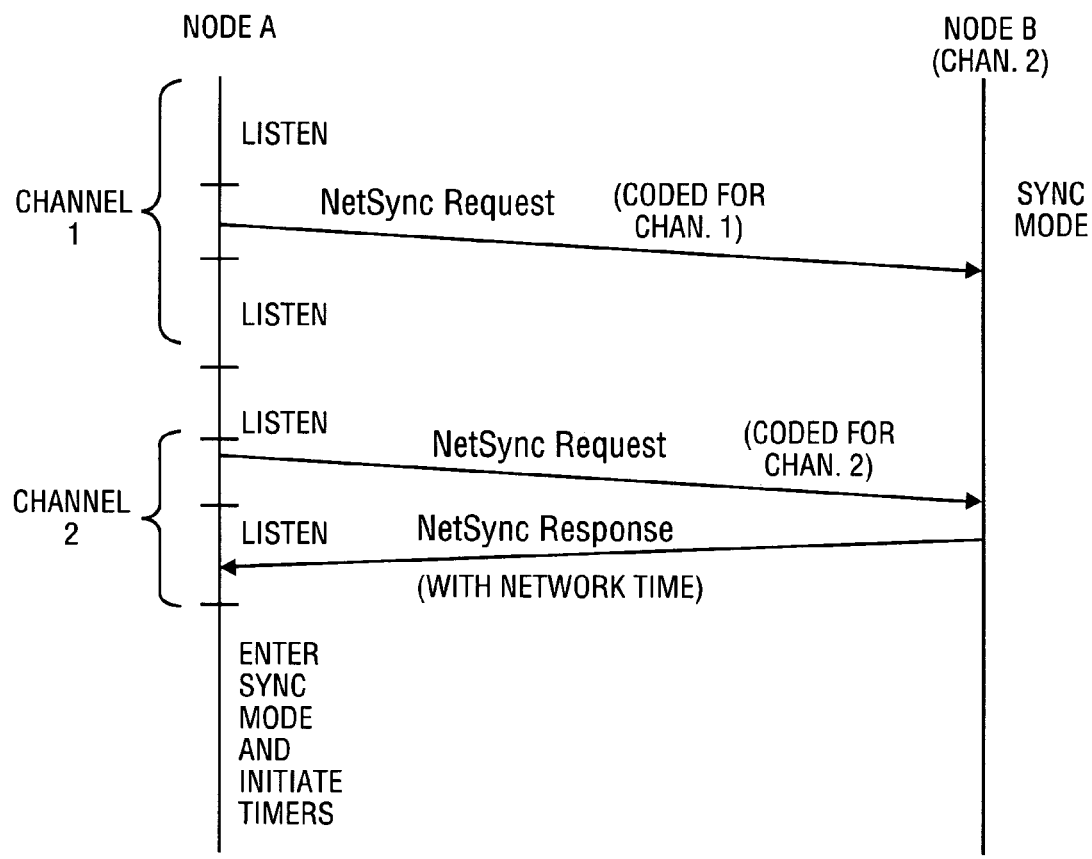
FIG. 3 illustrates a process by which a node synchronizes to a network in accordance with an embodiment of the present invention.

This process is illustrated in FIG. 3, where a Node A has recently powered up. Initially, Node A listens to channel 1 before transmitting a NetSync Request coded to that channel. Because Node B is operating on channel 2, no response is provided and so Node A moves on to channel 2 and transmits a new request.

If at any point a node in Sync Mode receives a NetSync Request packet (with the appropriate Network Code field, if used), it will send a NetSync Response packet (after waiting a random amount of time, some fraction of the time the node in Acquisition Mode listens to the channel before transitioning to the next channel). This is shown in FIG. 3 where Node B receives the properly coded request from Node A and transmits a response.

NetSync Response packets contain the precise Network Time, as determined by the transmitting node (Node B in FIG. 3) for the time the packet transmission started, and optionally, the Network Code (e.g., which can be used to avoid synching to a co-located network). As discussed below, this Network Time and Network Code pair may also be prepended, as a "NetSync Info" packet header, to other MAC- or higher-layer packets to assist in maintaining network synchronization.

Upon receiving a packet with the Network Time and the correct Network Code (either a NetSync Response packet, or other packet with NetSync Info header), a node in the Acquisition state (e.g., Node A in FIG. 3) immediately enters the Sync Mode, and initializes its Network Timer to the Network Time in the NetSync Response packet, adjusted for packet transmission, propagation and processing delays.

Maintaining Synchronization in a Network

Nodes in Sync Mode participate in a scheme to maintain synchronization in the network. Such maintenance is needed to compensate for different "drift" rates for each node's timer(s).

To allow for synchronization, each node prepends certain packets with a NetSync Info header. For example, these headers may be prepended to the first packet in each continuous transmission burst, or in a single-packet transmission, which may start transmitting at the slot boundary. Whenever a node receives a packet with a NetSync Info header (which optionally contains a Network Code matching its own), it first adjusts the packet's Network Time for packet transmission, propagation, and processing delays, and then compares the resultant Adjusted Network Time in the packet with its own Network Time.

If the packet's Adjusted Network Time is different from its own Network Time by an amount greater than some fraction (e.g., $\frac{1}{4}^{th}$) of a slot duration, then a merging process (see below) is used to adjust the node's Network Time. Otherwise, if the packet's Adjusted Network Time is less (younger) than its own Network Time, the NetSync Info header is ignored. Alternatively, if the packet's Adjusted Network Time is greater (older) than its own Network Time, the node adjusts its local Network Time according to a function of the local Network Time and the packet's Adjusted Network Time, for example as follows:

$$LocalNetworkTime = \alpha(LocalNetworkTime) + (1-\alpha)(AdjustedPacketNetworkTime),$$

where $\alpha$ is a smoothing constant (possibly set to 0). Of course, other Network Time functions may also be used.

Therefore, while maintaining network synchronization, each node's local Network Time is only adjusted in the forward direction, and the network will roughly track the time of the node in the network that happens to have the fastest clock. Of course, if that node leaves the network for some reason, then no disruption will occur. The Network Time will gracefully switch to tracking the time of the node with the next fastest clock.

Merging Two Synchronized Networks

If a node receives a packet with the correct Network Code (i.e., one that matches its own), but with an Adjusted Network Time significantly different from its own Network Time (as mentioned above), the node considers entering a "Transition Mode." However, before entering the Transition Mode, the node determines whether either network (here the node may consider itself as a node of a single network vs. the remaining nodes of the network, or a situation may arise where an edge node is making contact with a new network) has priority. If neither network is in a "locked" state, then the network with the older Network Time has priority. If one of the networks is locked, then it has priority. If both networks are locked, then the packet is ignored (and the Transition Mode is not entered). In some cases, if one of the networks has priority, then the node enters the Transition Mode (even if the node is in the older network). In other embodiments, if the node finds itself in the younger network, it always enters the transition Mode, but if it is in the older network it may or may not enter the Transition Mode.

A network may optionally enter the locked ("NetSync Locked") state under administrative control, to prevent a large network from being required to transition to a small, yet older network it comes in contact with. In the locked state, each NetSync Response packet and NetSync Info header may include a flag indicating the locked state, plus a sequence number (e.g., 2–3 bits long) used to determine the most recent lock/unlock command issued by the network administrator. All members of the network should automatically adopt this locked state upon receiving a packet with this flag set.

Also, any node receiving a "NetSync Transition Packet" (see below) with a Network Code and Network Time matching its own (within the bounds of the synchronization maintenance scheme discussed above) that is not already in Transition Mode should immediately enter the Transition Mode.

Figure 4:
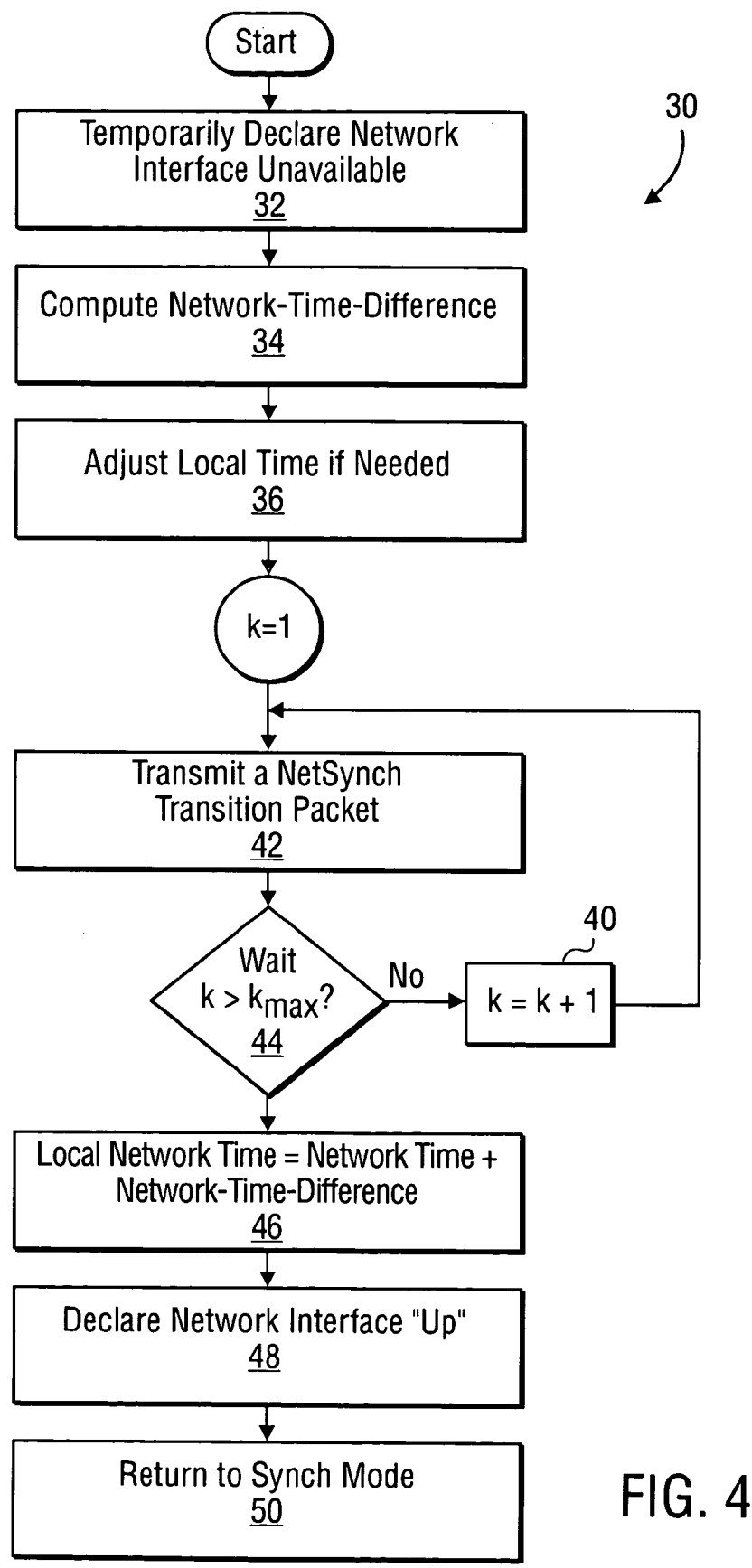
FIG. 4 illustrates a process by which a node may alter its local time to achieve synchronization with a network in accordance with an embodiment of the present invention.

As shown in FIG. 4, in the process 30 of entering the Transition Mode, the node first temporarily declares its network interface "down" or unavailable for higher-layer protocols (step 32). Then, at step 34, the node computes the difference between the older and younger Network Times (Network-Time-Difference). If necessary, the node adjusts the local time to match the Network Time of the younger network (step 36).

While in the Transition Mode, the node executes a subprocess 40 some number of iterations (e.g., defined by counter k in process 30) as controlled by a protocol input parameter (represented by $k_{max}$ in the figure), being careful to avoid being "outside" of the older network long enough to drift away from its timing. During sub-process 40, the node transmits a "NetSync Transition Packet," which includes the Network-Time-Difference and the current Network Time of the younger network (step 42), and then waits (step 44) a random amount of time (with range controlled by a protocol input parameter).

Once the node completes this sub-process 40 the specified number of times, the node exits the Transition Mode. In doing so, the node adjusts the local Network Time to match that of the older network by adding Network-Time-Difference to the current Network Time (step 46), declares the network interface to be back "up" for higher-layer protocols (step 48) and then returns to Sync Mode (step 50).

Non-Negotiated, Collision-Free Scheduling

The scheduling process used by the present integrated communications protocol combines topology-independent scheduling for determining candidate packet transmission slots with a topology-dependent scheme to avoid collisions in contended slots. Collision-avoidance for contended slots is achieved without requiring any real-time communication between nodes. Nodes need only know their own 2-hop neighborhood and have some agreement on the Network Age. This is unlike prior schemes, which require a fixed repeating schedule, see, e.g., I. Chlamtac et al., "Time-Spread Multiple-Access (TSMA) Protocols for Multihop Mobile Radio Networks," IEEE/ACM Transactions on Networking, Vol. 5, No. 6 (December 1997); Ji-Her Ju & Victor O. K. Li, "An Optimal Topology-Transparent Scheduling Method in Multihop Packet Radio Networks," IEEE/ACM Transactions of Networking, Vol. 6, No. 3 (June 1998), or require radios that can receive multiple transmissions at once, see, e.g., T. Shepard, "A Channel Access Scheme for Large Dense Packet Radio Networks," SIGCOMM '96 Conference Proc., ACM (1996).

In ad-hoc networks, such as network 10 of FIG. 1, it is generally important that collision-free scheduling be assured not only between a node and its direct neighbors, but also between the node and its 2-hop neighbors, to avoid "hidden terminal" receive-collisions at direct neighbors. For example, consider a situation where a given node (the "subject node") has two direct neighbors, neither of which is a direct neighbor of the other, and which both attempt to transmit packets to the subject node at approximately the same time on the same channel. The resulting collision (a receive collision at the subject node) may only be detected by the subject node and not by the transmitting nodes, which have no direct knowledge of one another. To avoid such collisions by "hidden terminals" then, nodes need some knowledge of their 2-hop neighbors and that knowledge is provided for in the present scheme.

Optionally, each node (i) may have a priority bias (PB(i)), and should learn the priority biases of the nodes in its 2-hop neighborhood. The priority bias may be used to give scheduling priority to important nodes in the network, such as nodes attached to high-speed links to the Internet, or to allow nodes to space their transmissions to occur less frequently, for example to conserve power.

For each frame, each node (i) computes its candidate-transmission-slot (CS(i)) by using a globally known function (SlotFunc) that accepts the Network Age (NetAge) and a node's ID (in the present scheme, each node has a unique node ID and learns the unique node IDs of the nodes in its 2-hop neighborhood; a node's Internet Protocol (IP) and/or MAC addresses are examples of unique node ID) as inputs:

$$CS(i)=\text{SlotFunc}(ID(i), \text{NetAge}).$$

Figure 5:
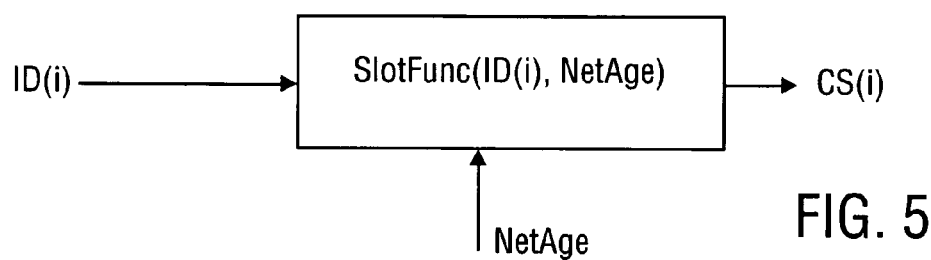
FIG. 5 illustrates a process by which a node determines a candidate slot for transmissions within a network in accordance with an embodiment of the present invention.

SlotFunc will produce an integer from 1 to S, where S represents the total number of candidate slots per frame (e.g., S may be the number of slots devoted to the transmission of control packets where a frame is divided into slots for control packets and slots for data packets). This process is illustrated diagrammatically in FIG. 5. Optimally, when given a varying sampling of inputs a and b, SlotFunc (a, b) will produce a varying (e.g., uniformly random) distribution of results varying from 1 to S. However, fast approximations to this behavior may result in the best system performance.

An example SlotFunc(a, b) is an encryption function (such as the Data Encryption Standard (DES)), where ID(i), possibly padded to the relevant encryption block size, is the data to be "encrypted" and NetAge is treated as the encryption key. The result of the "encryption" operation is then truncated to the number of bits needed to identify a slot number (assuming the number of slots in a frame (S) is an integer power of 2). Use of encryption also allows the Network Age to be concatenated with a secret "Network Code" known only by authorized nodes in the network, to help prevent potential intelligent interferers or eavesdroppers from being able to synchronize to the scheduling process. Note that the Network Code may also be used by other SlotFunc(a, b) methods to randomize the scheduling of packets to observers, though possibly in a less theoretically secure fashion.

Another example SlotFunc(a, b) is a hash function (such as the MD5 hash function). With such a process, a and b would be concatenated and then applied to the hash function as an input. Again, the lower-bits of the result could be used to determine the result (from 1 to S).

A third example would tradeoff the ideal qualities of the SlotFunc for speed. For instances, a table (PnSlotTable) of F entries, F representing the number of frames per epoch, could be loaded with pseudorandom values from 1 to S (again, S is a power of 2) during system initialization (or with any entry computed "on-the-fly" as needed). Then, SlotFunc(a, b)=(Trunc(a)^PnSlotTable[b]), where "^" denotes the exclusive-OR operation, and Trunc (a) truncates "a" to a number from 1 to S (or exclusive-ORs the higher bits with the lower bits to result in a more random truncated result).

Each node may also compute the candidate-transmission-slot of each of the nodes(j) in its 2-hop neighborhood, using their respective node IDs, the globally known Network Age, and the same SlotFunc function.

CS(j)=SlotFunc(ID(j), NetAge)

Of course, CS(n) (where n is a node number corresponding to the input node ID) will give the same result, independent of which node is doing the computation (the local node, or one of the nodes in its 2-hop neighborhood). Therefore, each node is able to determine which, if any, of the nodes in its 2-hop neighborhood share the same candidate transmission slot. The IDs of these nodes are placed into node i's contender Group (CG(i)) for this frame.

CG(i)={j:CS(i)=CS(j)}

From the above discussion, it should be apparent that all nodes of the contender group will be competing for transmission in the same candidate slot of a particular frame.

Figure 6:
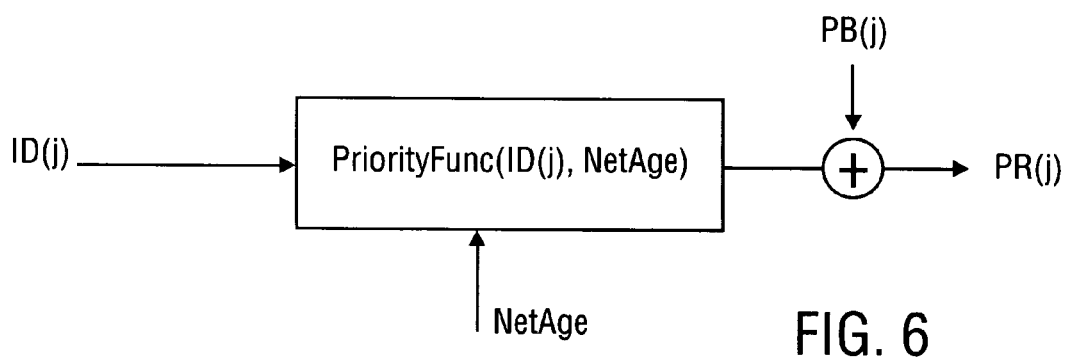
FIG. 6 illustrates a process by which a node may resolve conflicts over a candidate transmission slot chosen according to the procedure illustrated in FIG. 5.

As shown in FIG. 6, each node (i) then computes the priority PR(j) of each node in its contender group, to determine which node has priority for this frame among these contenders, using the node ID, scheduling frame number, and optionally, the node's priority bias, as inputs into a globally known Priority Function (PriorityFunc). If priority biases are not used, then PB(j) is set to 0.

PR(j)=PriorityFunc(ID(j), NetAge)+PB(j)

A node (i) may consider itself the winner of the contention if PR(i) is greater than any PR(j) in the contender group, or if PR(i) is tied for greatest, and would be the greatest if all priority biases were 0. In such cases, node i will transmit in slot CS(i).

The PriorityFunc(a, b) is chosen so that it provides a number that is unique for each possible input "a". For example, and similar to the SlotFunc, the PriorityFunc may use an encryption algorithm to give a unique priority to each ID(j) input, given the same NetAge "key." Another example, also similar to another SlotFunc example, is to use a table (PnPriorityTable, which is different than PnSlotTable) of F entries, loaded with pseudorandom values covering the range of possible node IDs. Then, PriorityFunc(a, b)=(a^PnPriorityTable[b]).

In other cases, a table may be filled with pseudorandom values and, for each contender for the slot, the corresponding index to the table may be found by XORing the MAC address (or other ID parameter) of the node with the Network Age, modulo the size of the table. The resulting value from the table (i.e., the table entry indexed by the above function) is then the initial priority determination. However, it is conceivable that ties could result, so to break any ties the MAC address (or other ID parameter) of the node may be XORed with the table entry (i.e., the table value retrieved from the above indexing procedure) to produce a second priority value and the node with the highest second priority value may be declared the winner.

In some cases, node i will transmit in its candidate-transmission-slot (CS(i)) in the current frame if and only if it is the winner in its contender group and if its PR(i) is equal to or greater than a PriorityThreshold. An example PriorityThreshold is the minimum value of PriorityFunc(a, b). In this case, the threshold would only affect nodes that have a negative PB(i), which may be the case for nodes conserving battery power. As another example, a greater value for PriorityThreshold may instead be used to increase the occurrence of slots where no node within a 2-hop neighborhood is permitted to transmit, thus freeing up this slot for a transmission by new or mobile nodes attempting to join a neighborhood. Also, a set of node IDs may be reserved for use by new or mobile nodes on a temporary basis and always assumed to be present for the SlotFunc( ) and PriorityFunc( ) purposes.

Assuming all nodes have equal priority for the channel, the probability of a node gaining access to the channel for transmission in any given frame (with S candidate slots per frame, and a 2-hop neighborhood size of Z, which includes the node itself) has been determined to be:

$$P_S = \left(\frac{S}{Z}\right)\left[1 - \left(1 - \frac{1}{S}\right)^Z\right]$$

Each node should have a chance to access the channel at least once within a reasonable number of consecutive frames. The probability of a node accessing the channel within F frames is then:

$$P_S(F) = 1 - (1 - P_S)^F$$

A question that arises is whether it better to arrange time in short frames with fewer candidate slots per frame, or in long frames with many candidate slots per frame but a longer time between frames? With this in mind, $P_S(F)$ was analyzed with some interesting results.

In a dense network (where nodes are more likely to be contending for control slots), it has been determined that it is generally better to have more slots per frame, and thus, a longer time between frames. However, in a sparse network, it has been found to be better to have a small number of slots per frame. For example, for a node with a two-hop neighborhood of 20 nodes (N=20), the probability for accessing the channel after a total of 100 slots divided up into 1, 2, or 4 frames is as follows:

100 slots/frame, one frame total, $P_S(1)$=91.1%
50 slots/frame, two frames total, $P_S(2)$=97.1%
25 slots/frame, four frames total, $P_S(4)$=99.1%

So, in this case, scheduling within 25 slots/frame and 4 frames is substantially better than using 100 slots/frame and only 1 frame.

It appears that a good compromise is to design for the numbers of slots per frame equal to about ½ to ¼ the average expected number of two-hop neighbors per node. However, the present scheme is quite robust to large variances from this expected density.

By way of example, consider an implementation where the non-negotiated scheduling scheme is used to schedule the transmission of MAC-layer control packets in a network where only 10% of a frame time should be devoted to control packet transmission (leaving 90% for data transmission), four frames are transmitted per epoch, $P_S(F)$ should be approximately 99%, and each node should be allowed to support 8 neighbors (using power control to limit the size of the neighborhood).

For example, if each node has a 36-node, 2-hop-neighborhood and there are 40 control-slots per frame (400 total slots per frame), each node has an approximately 99% probability of transmitting its MAC-layer control packet within 4 frames. At 500μsec/slot, this is 200 msec/frame or 800 msec for 4 frames (for an approximately 99% successful control packet transmission per node).

If these control packets are used to schedule guaranteed slots for the transfer of data traffic (i.e., if a frame were divided up into a control portion and a data portion, where the control packets were used to specify which "data slots" were to be used for transmitting data), then it would take on the order of 200 (or worst-case, up to around 800) msec per-hop in a wireless multihop network with the above characteristics to perform the initial setup of a service-sensitive continuous data stream. Alternatively, in a sparse network with an average a 10-node 2-hop-neighborhood, 10 control-slots per frame (100 total slots per frame) and where each node has a 98.52% probability of transmitting its MAC-layer control packet within 4 frames, at 500 μsec/slot, this is 50 msec per frame or 200 msec for 4 frames (for an approximately 99% successful control packet transmission per node).

Scheduling of Collision-Free Data Transfers

Figure 7:
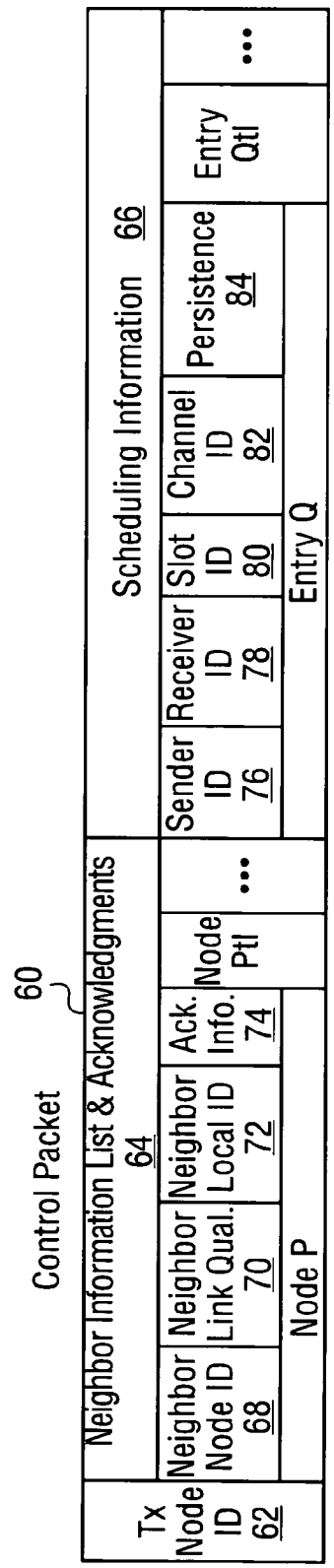
FIG. 7 illustrates one example of a control packet that may be transmitted within the network shown in FIG. 1.

In general, the present scheduling methods may be used for scheduling data and/or network control packets. In one embodiment, nodes use the non-negotiated scheduling methods to schedule the transmission of control packets over a common control channel. Depending upon what information may be important within the network, some or all of the following types of information may be passed within the control packets: neighbor lists and neighbor quality information; link-layer acknowledgments of recent packets from each neighbor; and the scheduling information for data packets for subsequent frames. Therefore, referring to the example of a control packet 60 depicted in FIG. 7, various control packet structures may include fields for the Transmitting Node ID 62, the Neighbor Information List and Acknowledgments 64, and the Scheduling Information 66.

Within the neighbor information list and acknowledgment field 64, for each logical neighbor node P (accepted by the protocols) the control packet 60 may include a Neighbor node ID 68, a Neighbor link quality 70, a Neighbor Local Identifier 72, and acknowledgment (Ack.) information 74. For each physical neighbor node that has not (yet) been accepted by the protocols, the control packets may include only the Neighbor node ID 68 and the Neighbor link quality 70.

Thus, one example of the use of the non-negotiated scheduling methods presented herein is the scheduling of neighbor management information to be passed between the nodes. For example, each node may send a list of the node IDs (e.g., MAC addresses) of its current neighbors. This may include those neighbors that have been accepted by the node as neighbors to be used for forwarding packets, and others (if any) that have not been accepted, but are nevertheless within transmission reach of the node. In addition, included with each neighbor node ID may be an indication of the quality that the node has computed for the link to this neighbor. Also, a neighbor local identifier may optionally accompany each node ID in the list, which is this node's abbreviated representation of the neighbor's node ID, and is useful for reducing the size of subsequent, link-specific control packet information transmitted by this node. Further, each neighbor node ID may be accompanied by a packet acknowledgement information, which provides the success/failure status of some recent history of packet receptions (or lack of receptions) at the node from each neighbor.

By receiving this information from each of its neighbors, a node is able to discover all of the physical node IDs in the node's two-hop neighborhood (for use in the above scheduling process). Also, receiving this information will allow the node to learn the quality that each of its neighbors has computed for the link with this node. This may, in turn, influence the quality computed by this node for that link, as well as this node's decision on whether to use a particular link for forwarding packets. In addition, each node will learn which recent data packets were successfully received, and which others were not (possibly requiring retransmission).

Moreover, the control packets 70 may specify a schedule list consisting of one or more entries Q, and each entry preferably including a sender identifier 76, a receiver identifier 78, a slot identifier 80, a channel identifier 82, and a persistence indicator 84. Thus, the control packets may provide information to be used by another process to schedule corresponding data packets.

The sender identifier 76 corresponds to a node that is known to be scheduled to transmit in the slot and channel specified in the entry. The node sending the control packet reports its own scheduled transmissions and the scheduled transmissions from its immediate (1-hop) neighbors.

The receiver identifier 78 corresponds to the receiver that is scheduled to receive the transmission from the specified sender. A special identifier (e.g., all 1s) may be used to designate "all neighbors of the sender," e.g., for broadcast transmissions. The identifier of a multicast group may be used to designate "all neighbors participating in multicast group" for the case of multicast transmissions.

The time slot and data channel identifiers 80 and 82 specify the time in a frame and channel used at that time for the scheduled data transmission from the specified source to the specified receiver or group of receivers.

The persistence identifier 84 establishes the number of frames beyond the current frame for which the transmission is scheduled.

As indicated above, to reduce the number of bits needed to specify senders or receivers in control packets, a node may use local identifiers to denote senders and receivers of scheduled transmissions. Because only a portion of the traffic from all nodes traverse the neighborhood of a given node, local identifiers can be much smaller than the network-wide identifiers needed to denote nodes in the network.

Where such local identifiers are used, during network operation a node may send a mapping of node identifiers to local identifiers periodically, e.g., one every few control packets. This mapping can be conveyed in different ways. For example, a node may transmit a list of the mappings from node identifiers to local identifiers for each of its neighbors, including the mappings for intended receivers.

In other control packets, the scheduling information field 66 may contain a Transceiver ID (e.g., in the case of multiple co-located transceivers per node), followed by one or more of the above schedule blocks. In addition, a Transmit/Receive flag, and/or a Waveform Information field (e.g., where different waveforms for different channels are used) may be present. A control packet may contain one schedule information block 66 for each transceiver in a node with co-located transceivers and each schedule information block 66 may contain one or more schedules.

Discovery & Acceptance of New and Mobile Nodes

As explained above, the non-negotiated scheduling of control packets in the present communications protocol requires that a node know its 2-hop neighbors. When nodes move, links and/or nodes fail or new nodes or links are added to the network, the information a node has about its 2-hop neighborhood may be incorrect for some time. Because of such temporary inaccuracies, more than one node may transmit a control packet in a given control slot. To prevent such collisions from occurring indefinitely the present communications protocol utilizes a collision-resolution mechanism.

The collision-resolution mechanism is based on the non-negotiated scheduling process described above. Each node listens on all control slots of a frame other than the slot over which it determines it should transmit its control packet according to the non-negotiated scheduling process. A node is then able to detect that its control packet collided with others or was not received correctly by at least one neighbor when it receives a control packet from a neighbor such that the schedule advertised in the control packet conflicts with the schedule that the node transmitted in its own control packet. In such cases, the node can use a simple deterministic election process to determine which schedule should be the winner, i.e., which node should change its own schedule according to the schedule advertised by the other node.

The simplest such scheme may make the largest (or smallest) identifier of nodes with conflicting schedules the winner, or may use the PriorityFunc( ) described above. Accordingly, if a node receives a schedule from another node such that some of the entries in the schedule (i.e., proposed slots and channels for sender-receiver pairs) win over sender-receiver pairs using the same slots and channels in the schedule currently adopted by the receiving node, then the receiving node may modify its own schedule to reflect all the winning sender-receiver pairs and transmit a modified schedule in the next control slot that it can access according to the non-negotiated scheduling process. In addition, the receiving node updates its 2-hop neighborhood state with each control packet it receives, which modifies the scheduling of its own control packets according to the non-negotiated scheduling process.

As discussed above, when a node is first initialized or restarted it listens for a period of time equal to one or multiple frames over the control channel. During that time, it is able to hear the control packets from a few of its neighbors, from which it can establish an initial state for its 2-hop neighborhood. If the node does not hear any transmission during the initialization period, it transmits a control packet according to the non-negotiated scheduling process. A node thus learns about the existence of its 2-hop neighbors from the control packets it hears. Continuing collisions of control packets from the same group of nodes are avoided, because of the way in which nodes are assigned to control slots. Continuing collisions of data packets are avoided, because eventually all nodes are able to identify their 2-hop neighbors, send control packets without collisions, and decide the winning schedules for data packets using such control packets.

Thus a communication protocol for wireless networks has been described. The protocol is robust to mobility or other dynamics, and for scaling to dense networks. In a mobile or otherwise dynamic network, it appears that any control-packet collisions will be only temporary and fair. That is, during a transient period, if a transmission by a new node X in a neighborhood causes a collision with the transmission of another node Y, a potential subsequent transmission by X will have only an equal probability of colliding with Y's transmission as with that of any other node in X's new neighborhood. In a dense network, the network performance degrades gracefully, ensuring that only a certain percentage of the common channel is consumed with control packets. The denser the network, the longer the access times for nodes to make data scheduling changes. However, the overall network capacity remains constant. Moreover, because the integrated protocol allows packets (e.g., data scheduling control packets) to be scheduled in a collision-free and predictable manner (known to all neighbors), multicast packets can be reliably scheduled, as well as streams of delay- or delay-jitter-sensitive traffic. Further, using an optional secret network code, e.g., known only to authorized nodes in the network, the scheduling of control packets can appear to observers to be randomized—a useful security feature in some environments.

Although the foregoing description and accompanying figures discuss and illustrate specific embodiments, it should be appreciated that the present invention is to be measured only in terms of the claims that follow.

What is claimed is:

1. A method, comprising activating a node of a computer network such that the node first attempts to establish contact with other nodes that may exist within the computer network by cycling through a set of common channels for communication within the computer network, the node at each channel attempting to establish contact by transmitting a request packet including a code identifying the network thereon and, after transmitting a request packet on one of the common channels, the node listens for a response packet before proceeding to a next one of the common channels, wherein upon receiving a response packet including the code identifying the network first transmitted by the request packet from one of the other nodes, the node enters a synchronization mode and joins the computer network and, if unsuccessful in establishing contact with other nodes, then the node establishes itself as a single node network, wherein the response packet includes a parameter specifying time with the computer network.

2. A method, comprising activating a node of a computer network such that the node first attempts to establish contact with other nodes that may exist within the computer network by cycling through a set of common channels for communication within the computer network, the node at each channel attempting to establish contact by transmitting a request packet including a code identifying the network thereon and, after transmitting a request packet on one of the common channels, the node listens for a response packet before proceeding to a next one of the common channels, wherein upon receiving a response packet including the code identifying the network first transmitted by the request packet from one of the other nodes, the node enters a synchronization mode and joins the computer network and, if unsuccessful in establishing contact with other nodes, then the node establishes itself as a single node network;

wherein while the node is established as a single node network, the node listens for attempts by further nodes to join a network;

upon detecting one or more attempts by the further nodes to join a network, the node transmits a response thereto; and the response includes an indication of time within the single node network.

3. The method of claim 2 wherein the response further includes a network code.

4. A method comprising:

receiving, at first node of a computer network, a packet from a second node of the computer network;

using information contained in the packet from the second node in determining whether or not to adjust a time at the first node according to whether a priority of the second node is lesser or greater than a priority of the first node;

adjusting the time at the first node only if the priority of the second node is greater than the priority of the first node; and not adjusting the time at the first node if the priority of the second node is less than or equal to the priority of the first node, wherein the information contained in the packet from the second node includes an indication of time within the computer network according to the second node, wherein if both the first and second nodes are not locked, then the priority of the second node is greater than the priority of the first node if the indication of time of the second node is greater than the time at the first node.

5. The method of claim 4 wherein the first node first transmits a Transition Request packet before adjusting the time at the first node.

6. The method of claim 5 wherein nodes synchronized with the first node receive the Transition Request packet from the first node and adjust corresponding local times according to a time specified in the Transition Request packet.

7. The method of claim 4, wherein the indication of time is adjusted for delays within the computer network.

8. A method, comprising computing a transmission time for a packet from a first node of a computer network according to the identification of the node and an indication of the network age up to the start of a current frame within which the packet is to be transmitted and, wherein the computing is performed using a function that provides a varying distribution of results for varying inputs of the identification of the first node and the age of the network, the results ranging from a minimum to a maximum representing a number of transmission slots per frame within which a control packet may be transmitted.

9. The method of claim 8 wherein the packet comprises a network control packet.

10. The method of claim 9 wherein the control packet advertises a schedule for a data transmission.

11. The method of claim 10 wherein the schedule includes an identification of one or more nodes to receive the data transmission.

12. The method of claim 11 wherein the schedule further includes a data transmission time.

13. The method of claim 12 wherein the schedule further includes a data transmission channel.

14. The method of claim 8 wherein the function comprises an encryption function.

15. The method of claim 8 wherein the function comprises a hash function.

16. The method of claim 15 wherein the hash function comprises the MD5 hash function.

17. A method, comprising computing a transmission time for a packet from a first node of a computer network according to the identification of the node and an indication of the network age up to the start of a current frame within which the packet is to be transmitted, wherein the computing is performed using a table of entries of pseudorandom values.

18. The method of claim 17 wherein the pseudorandom values represent transmission slots within the frame within which a control packet may be transmitted.

19. The method of claim 17 further comprising computing, at the first node, transmission times for other nodes of the computer network.

20. The method of claim 19 wherein computing transmission times for the other nodes is performed using unique identifiers for each of the other nodes and the network age.

21. The method of claim 20 wherein computing transmission times for the other nodes is accomplished using a function that is also used for computing the transmission time for the first node.

22. The method of claim 21 wherein the other nodes are all within a two-hop neighborhood of the first node in the computer network.

23. The method of claim 22 wherein the first node resolves contentions for transmission times between itself and any of the other nodes according to a priority determination.

24. A method, comprising computing a transmission time for a packet from a first node of a computer network according to the identification of the node and an indication of the network age up to the start of a current frame within which the packet is to be transmitted, further comprising computing, at the first node, transmission times for other nodes that are within a two-hop neighborhood of the first node in the computer network using unique identifiers for each of the other nodes and the network age, wherein computing transmission times for the other nodes is accomplished using a function that is also used for computing the transmission time for the first node, wherein the first node resolves contentions for transmission times between itself and any of the other nodes according to a priority determination which uses a function that provides a unique output for various identification and network age inputs.

25. The method of claim 24 wherein the function comprises an encryption algorithm.

26. The method of claim 24 wherein the function comprises a table look-up.

27. The method of claim 24 wherein the priority determination is further made using a priority bias associated with each of the nodes.

28. The method of claim 27 wherein the first node transmits at the transmission time if it is determined to have priority over the other nodes.

29. The method of claim 8 wherein the first node transmits at the transmission time if it further has priority exceeding a priority threshold.

30. The method of claim 24 wherein the first node transmits at the transmission time if it is determined to have priority over the other nodes.

31. The method of claim 30 wherein the first node transmits at the transmission time if it further has priority exceeding a priority threshold.

32. A method, comprising computing a transmission time for a packet from a first node of a computer network according to the identification of the node and an indication of the network age up to the start of a current frame within which the packet is to be transmitted, wherein the packet comprises a network control packet which advertises a schedule for a data transmission, and the schedule includes a persistence indicator.

33. A method, comprising computing a transmission time for a packet from a first node of a computer network according to the identification of the node and an indication of the network age up to the start of a current frame within which the packet is to be transmitted, wherein the packet comprises a network control packet which advertises a schedule for a data transmission and the schedule includes an identification of one or more nodes to receive the data transmission, wherein the nodes to receive the data transmission are identified by local identifiers being smaller than network identifiers associated with the nodes.

34. The method of claim 33 wherein the first node transmits a mapping of the local identifiers to the network identifiers within the network.

35. A method, comprising computing a transmission time for a packet from a first node of a computer network according to the identification of the node and an indication of the network age up to the start of a current frame with which the packet is to be transmitted, further comprising computing, at the first node, transmission times for other nodes that are within a two-hop neighborhood of the first node in the computer network using unique identifiers for each of the other nodes and the network age, wherein computing transmission times for the other nodes is accomplished using a function that is also used for computing the transmission time for the first node, wherein the first node resolves contention for transmission times between itself and any of the other nodes according to a priority determination and the priority determination is made using a table of pseudorandom values.

36. The method of claim 35 wherein the table of pseudorandom values is indexed by a value derived from a media access control layer address of the first node to retrieve an entry corresponding to a first priority determination.

37. The method of claim 36 wherein the first priority determination is checked by logically combining the media access control layer address of the first node with the entry corresponding to the first priority determination to resolve conflicts.

38. A method, comprising using a topology-independent scheduling procedure utilizing an age of the network and unique identifiers for each node of the network to determine the candidate packet transmission times within a computer network for each of the nodes therein and a topology-dependent scheduling procedure to avoid collisions in contended time periods, wherein the topology-independent scheduling procedure computes the candidate transmission times for each of the nodes using a function that provides various distribution of outputs for various sampling of inputs.

39. The method of claim 38 wherein the function comprises at least one of a hash function, an encryption function or a table look-up operation.

40. The method of claim 38 wherein conflicts for the candidate transmission times for each of the nodes are resolved according to a priority associated with each of the nodes.

41. The method of claim 40 wherein the priority for each of the nodes is determined according to a function that provides a unique output for each set of inputs.

42. The method of claim 41 wherein the function that provides a unique output for each set of inputs comprises at least one of an encryption function, a hash function or a table look-up operation.

43. The method of claim 41 wherein the inputs to the function that provides a unique output for each set of inputs comprise one or more of a unique identifier associated with each node, a scheduling frame number for the network, and a priority bias for each node.

44. A network comprising:
a node,
wherein the node first attempts to establish contact with other nodes that may exist within the network by cycling through a set of common channels for communication within the network, the node at each channel attempting to establish contact by transmitting a request packet including a code identifying the network thereon and, after transmitting a request packet on one of the common channels, the node listens for a response packet before proceeding to a next one of the common channels, wherein upon receiving a response packet including the code identifying the network first transmitted by the request packet from one of the other nodes, the node enters a synchronization mode and joins the computer network and, if unsuccessful in establishing contact with the other nodes, then the node establishes itself as a single node network, and
wherein the response packet includes a parameter specifying time with the computer network.

45. The network of claim 44, wherein upon detecting one or more attempts by the other nodes to join a network, the node transmits a response thereto.

46. The network of claim 44, wherein the response includes an indication of time within the single node network.

47. The network of claim 46, wherein the response further includes a network code.

48. The network of claim 44, wherein while the node is established as a single node network, the node listens for attempts by further nodes to join a network.

49. A network comprising:
a node,
wherein a transmission time for a packet from the node is computed according to the identification of the node and an indication of the network age up to the start of a current frame within which the packet is to be transmitted and, wherein the computing is performed using a function that provides a varying distribution of results for varying inputs of the identification of the node and the age of the network, the results ranging from a minimum to a maximum representing a number of transmission slots per frame within which a control packet may be transmitted.

50. The network of claim 49, wherein the packet comprises a network control packet.

51. The network of claim 49, wherein the function comprises an encryption function.

52. The network of claim 49, wherein the function comprises a hash function.

53. The network of claim 52, wherein the hash function comprises the MD5 hash function.

54. A network comprising:
a first node,
wherein a transmission time for a packet from the first node is computed according to the identification of the node and an indication of the network age up to the start of a current frame within which the packet is to be transmitted, wherein the computing is performed using a table of entries of pseudorandom values.

55. The network of claim 54, wherein the pseudorandom values represent transmission slots within the frame within which a control packet may be transmitted.

56. The network of claim 54, wherein the first node computes transmission times for other nodes of the computer network.

57. The network of claim 56, wherein the first node computes transmission times for the other nodes using unique identifiers for each of the other nodes and the network age.

58. The network of claim 57, wherein the other nodes are all within a two-hop neighborhood of the first node in the computer network.

59. The network of claim 58, wherein the first node resolves contentions for transmission times between itself and any of the other nodes according to a priority determination.

60. A network comprising:
a first node; and
other nodes,
wherein a transmission time for a packet from the first node is computed according to the identification of the node and an indication of the network age up to the start of a current frame within which the packet is to be transmitted,
wherein transmission times are computed, at the first node, for the other nodes that are within a two-hop neighborhood of the first node using unique identifiers for each of the other nodes and the network age,
wherein computing transmission times for the other nodes is accomplished using a function that is also used for computing the transmission time for the first node, and
wherein the first node resolves contentions for transmission times between itself and any of the other nodes according to a priority determination which uses a function that provides a unique output for various identification and network age inputs.

61. The network of claim 60, wherein the function comprises an encryption algorithm.

62. The network of claim 60, wherein the function comprises a table look- up.

63. The network of claim 60, wherein the priority determination is further made using a priority bias associated with each of the nodes.

64. The network of claim 63, wherein the first node transmits at the transmission time if it is determined to have priority over the other nodes.

65. The network of claim 64, wherein the first node transmits at the transmission time if it further has priority exceeding a priority threshold.

66. The network of claim 60, wherein the first node transmits at the transmission time if it is determined to have priority over the other nodes.

67. The network of claim 66, wherein the first node transmits at the transmission time if it further has priority exceeding a priority threshold.

68. A network comprising:
receiving means for receiving, at first node of the network, a packet from a second node of the network;
determining means for determining, using information contained in the packet from the second node, whether to adjust a time at the first node according to whether a priority of the second node is lesser or greater than a priority of the first node; and
adjusting means for adjusting the time at the first node only if the priority of the second node is greater than the priority of the first node,
wherein the information contained in the packet from the second node includes an indication of time within the computer network according to the second node, and
wherein, if both the first and second nodes are not locked, then the priority of the second node is greater than the priority of the first node if the indication of time of the second node is greater than the time at the first node.

* * * * *